US008838795B2

(12) United States Patent
Friedman

(10) Patent No.: US 8,838,795 B2
(45) Date of Patent: Sep. 16, 2014

(54) SYSTEM, METHOD, APPARATUS, AND PRODUCT FOR RESOURCE SHARING

(75) Inventor: Lee G. Friedman, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1196 days.

(21) Appl. No.: 11/004,367

(22) Filed: Dec. 3, 2004

(65) Prior Publication Data

US 2006/0123113 A1    Jun. 8, 2006

(51) Int. Cl.
*G06F 15/173* (2006.01)
*H04L 12/18* (2006.01)
*H04L 29/08* (2006.01)
*H04L 12/58* (2006.01)

(52) U.S. Cl.
CPC ........ *H04L 67/2804* (2013.01); *H04L 12/1822* (2013.01); *H04L 67/24* (2013.01); *H04L 12/581* (2013.01); *H04L 51/04* (2013.01)
USPC ............ 709/226; 709/205; 709/217; 709/229

(58) Field of Classification Search
USPC ......... 709/217–219, 249, 248, 206, 204, 205, 709/227, 226, 229; 455/412.2, 414.1
See application file for complete search history.

(56) References Cited

U.S. PATENT DOCUMENTS

| | | | |
|---|---|---|---|
| 6,785,542 B1 * | 8/2004 | Blight et al. ............... | 455/426.1 |
| 7,219,153 B1 * | 5/2007 | Day ............................. | 709/229 |
| 7,363,378 B2 * | 4/2008 | Holmes et al. ............... | 709/227 |
| 7,881,235 B1 * | 2/2011 | Arthur et al. ................. | 370/261 |
| 7,984,098 B2 * | 7/2011 | Enete et al. ................... | 709/204 |
| 2002/0007398 A1 * | 1/2002 | Mendiola et al. ............ | 709/206 |
| 2002/0035605 A1 * | 3/2002 | McDowell et al. .......... | 709/206 |
| 2002/0087887 A1 * | 7/2002 | Busam et al. ................ | 713/201 |
| 2004/0107143 A1 * | 6/2004 | Niemi ............................ | 705/26 |
| 2004/0172455 A1 * | 9/2004 | Green et al. .................. | 709/207 |
| 2005/0086311 A1 * | 4/2005 | Enete et al. .................. | 709/206 |
| 2005/0266836 A1 * | 12/2005 | Shan ............................ | 455/417 |
| 2006/0085515 A1 * | 4/2006 | Kurtz et al. .................. | 709/207 |

OTHER PUBLICATIONS

Ahn, J., Pierce, J., "SEREFE: serendipitous file exchange between users and devices" ACM International Conference Proceeding Series; vol. 111 Proceedings of the 7th international conference on Human computer interaction with mobile devices & services.pp. 39-46. 2005. [retrieved from ACM database on Jan. 29, 2010].*
N. Hindocha and E. Chien. "Malicious Threats and Vulnerabilities in Instant Messaging". Technical report, Symantec, 2003. [retreived from Internet on May 5, 2010 "http://www.ses.symantec.com/avcenter/reference/malicious.threats.instant.messaging.pdr"].*
Moran, A.L.; Favela, J.; Martinez, A.M.; Decouchant, D.;"Document presence notification services for collaborative writing", Groupware, 2001. Proceedings. Seventh International Workshop on Publication Year: 2001 , pp. 125-133. [retrieved from IEEE database on Nov. 19, 2010].*

* cited by examiner

*Primary Examiner* — Saleh Najjar
*Assistant Examiner* — Peiliang Pan
(74) *Attorney, Agent, or Firm* — Hanley, Flight & Zimmerman, LLC

(57) ABSTRACT

In a resource-sharing system comprising a host element, a shareable resource associated with the host element, and a presence server that is communicatively coupled to the host element, presence information of the shareable resource is provided. Resource data from the host element is provided to a guest element via a resource proxy server.

17 Claims, 11 Drawing Sheets

SYSTEM, METHOD, APPARATUS, AND PRODUCT FOR RESOURCE SHARING

TECHNICAL FIELD

The present disclosure is generally related to messaging and, more particularly, is related to sharing resources.

BACKGROUND

Many inventions occur as a result of an identifiable, primary need. For example, the telegraph system was invented to permit communications between people separated by a distance. Similarly, the telephone was invented to permit people to converse with one another when separated by a distance. With the passage of time, most of these inventions have undergone evolutionary changes that cater to needs beyond what was envisaged initially.

In the field of communication systems, the cellphone can be used as a first example in describing this evolutionary process. Cellphones initially provided a technological solution to the need for portability, wherein people could talk to one another while away from a conventional, wire-line telephone. Since then, cell phones have evolved beyond voice communications to now provide data communications as well. Data communication capabilities include web-surfing, e-mail, and short-message-services (SMS).

A second example to describe an evolutionary process in the field of communication technologies relates to e-mail. While the initial application for e-mail communication comprised people transmitting text messages to one another, subsequently, evolutionary applications now allow users to transfer data files and pictures as well.

A third example relates to instant messaging (IM). The initial application of instant messaging allowed users to carry on a quick, multi-directional, on-line exchange of messages. This form of "near-real-time" communication overcame the handicaps of greater message-interaction delays suffered by e-mail message transfers.

Having satisfied the initial, primary need for quick communication, IM underwent, and continues to undergo, evolutionary changes to provide facilities for exchanging certain objects in addition to text messages. For example, IM users can now transfer files and pictures in near-real-time mode as well.

In comparing the few examples explained above, it will be apparent that each technology provides certain advantages over the other technologies. As a corollary, each technology also suffers from certain handicaps in comparison to the other technologies.

The following example illustrates the relative advantages and disadvantages of these technologies. A user desiring to send a lengthy, formal text message to a business associate opts to use e-mail communication rather than IM. On the other hand, when the user is seeking a quick, and fairly informal, response from an on-line buddy, opts to use TM instead. In this above example, the e-mail system allowed a large file to be transported efficiently in spite of suffering a larger transmission delay in a situation where such a delay is acceptable, whereas using the IM system allowed faster communication in a more informal manner.

Delving further into certain aspects of the IM system, it will be relevant to point out that the ITM system is fairly user-friendly in permitting online text messaging, but is not necessarily so user-friendly in facilitating a private exchange of data files between two individuals of a buddy list. The level of complexity involved in operating IM to carry out certain such tasks is consequently quite high. These levels of operational complexity therefore necessitate an average user to have an undesirably high level of technical expertise. While IM has been used as one example technology, it will be recognized that complexity of use also extends to other technologies, including presence-based technologies that are currently undergoing evolutionary changes. Known presence-based technologies, as would be understood by those reasonably skilled in the art, include a system that maintains and provides status information pertaining to availability of users of the system, e.g., information indicating whether or not users are connected to a communications network.

It can therefore be understood that a need exists to provide a solution that simplifies certain operational tasks related to using communication systems, such as e-mail, IM and presence-based technologies.

SUMMARY OF THE DISCLOSURE

One embodiment, among others, of the present disclosure includes a resource sharing system comprising a host element, a shareable resource associated with the host element, and a presence server that is communicatively coupled to the host element. The presence server is configured to provide presence information of the shareable resource to users of the resource sharing system. The system further comprises a guest element communicatively coupled to the presence server, and a resource proxy server configured to receive a resource proxy request from the presence server.

Other devices, systems, methods, and/or computer program products according to exemplary embodiments will be or become apparent to one skilled in the art upon review of the following drawings and detailed description. It is intended that all such additional systems, methods, and/or computer program products be included within this description, be within the scope of the present disclosure.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in drawings, like reference numerals designate corresponding parts throughout the several views.

DETAILED DESCRIPTION

While the description below refers to certain exemplary embodiments, it is to be understood that the disclosure is not limited to these particular embodiments. On the contrary, the intent is to cover all alternatives, modifications and equivalents included within the spirit and scope of the disclosure. Also, the terminology used herein is for the purpose of description and not of limitation. For example, extensive reference is made to instant messaging systems, but it will be understood that this is done merely for explanation purposes, and many other communication systems that incorporate presence-based services can be included as well, among others. Furthermore, the use of certain terminology is also meant for ease of explanation, and alternative terms can be used in various embodiments. In one example among many, while reference is made to "elements," it will be understood that there exists various terms, such as "clients," "devices," and "computers" that can also be used alternatively.

Figure 1:
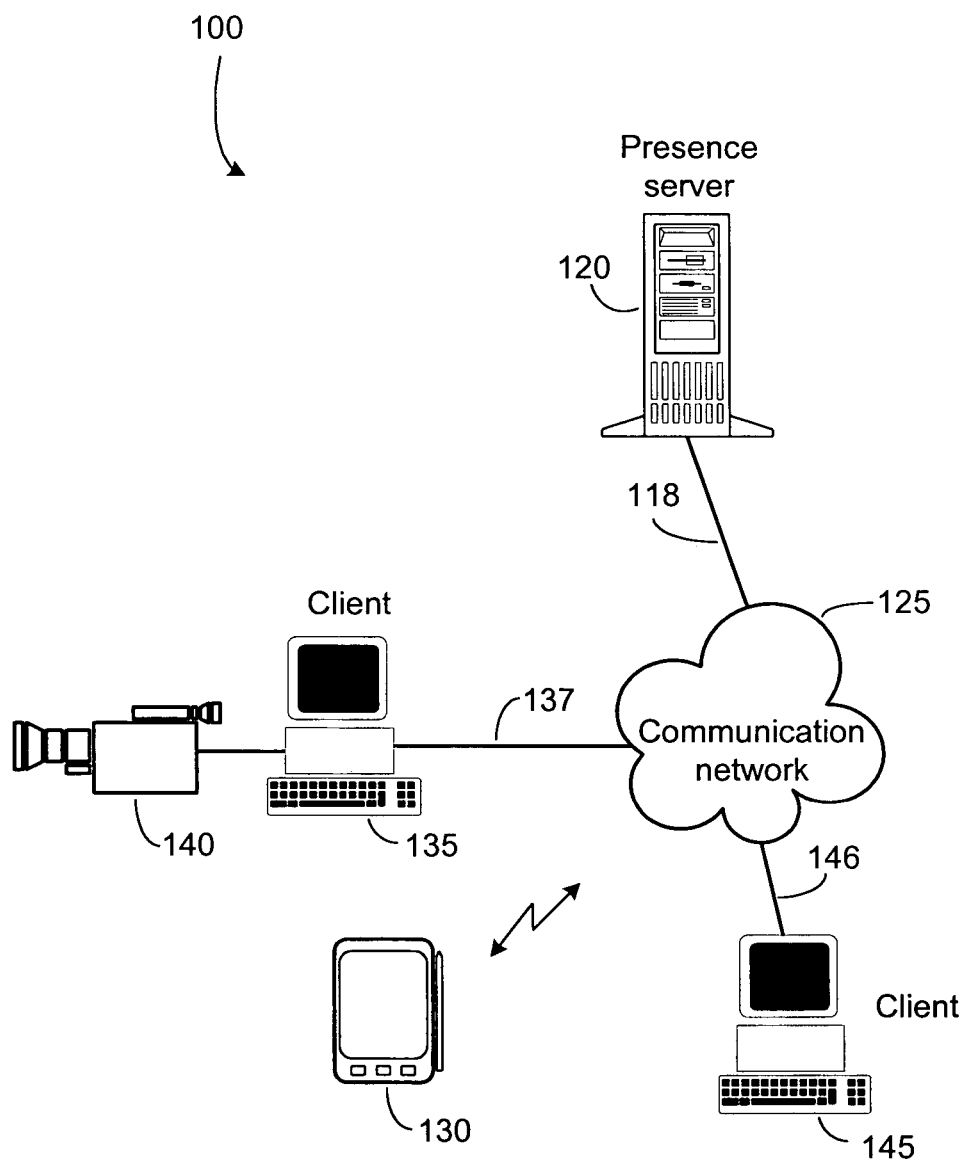
FIG. 1 illustrates a communication system configured to operate as a remote resource-sharing system using presence-based services according to an exemplary embodiment.

FIG. 1 illustrates one embodiment among many, of a remote resource-sharing system (RRSS) 100 incorporating presence-based services. It will be understood that the term "remote" is used in one embodiment to refer to a widely separated geographic distance, for example, several miles; whereas in a second embodiment the term will refer to a locally separated distance, for example, a few meters as would be the case inside a building. RRSS 100 includes a communication network 125 that comprises one or more networks, such as for example, the Internet, a local area network (LAN), a wide area network (WAN), a private network, a public network, the public switched telephone network (PSTN), a circuit-switched network, a packet-switched network etc. Presence server 120 operates to provide various services, such as for example, routing data packets related to data traffic, routing data related to messaging, e.g., Instant Messaging (IM), storing user-information related to IM, routing/processing data related to presence of users, and providing connectivity to multiple elements, e.g., elements 130, 135, and 145. Presence server 120 is communicatively coupled to communication network 125 by link 118, which in one exemplary embodiment among many, comprises a communication link carrying data packets conforming to Internet protocol (IP).

Element 135 is a personal computer (PC) that is located in a residence, for example. Attached to element 135 is a camera 140. Element 135 is communicatively coupled to network 125 through communication link 137, which, like links 118 and 146, can incorporate one or more of several technologies. Some examples of such technologies include wire-line, wireless, and optical technologies, which further incorporate transport mechanisms such as digital subscriber line (DSL), T1, T3, and asynchronous transfer mode (ATM), among others.

Element 130 is a personal digital assistant (PDA) that communicates wirelessly with network 125. Element 145 is a computing element, such as a PC or a workstation, that is located in an office and communicates with the communications network 125 via a communications link 146, which in one exemplary embodiment among many, comprises a communication link carrying IP data packets. In an alternative embodiment, element 145 is a laptop that communicates wirelessly with network 125. It will be understood that elements 135, 130, and 145 are shown merely as example elements, and many other elements such as cellular telephones, pagers, and handheld computers can be incorporated into the system of FIG. 1.

Figure 2:
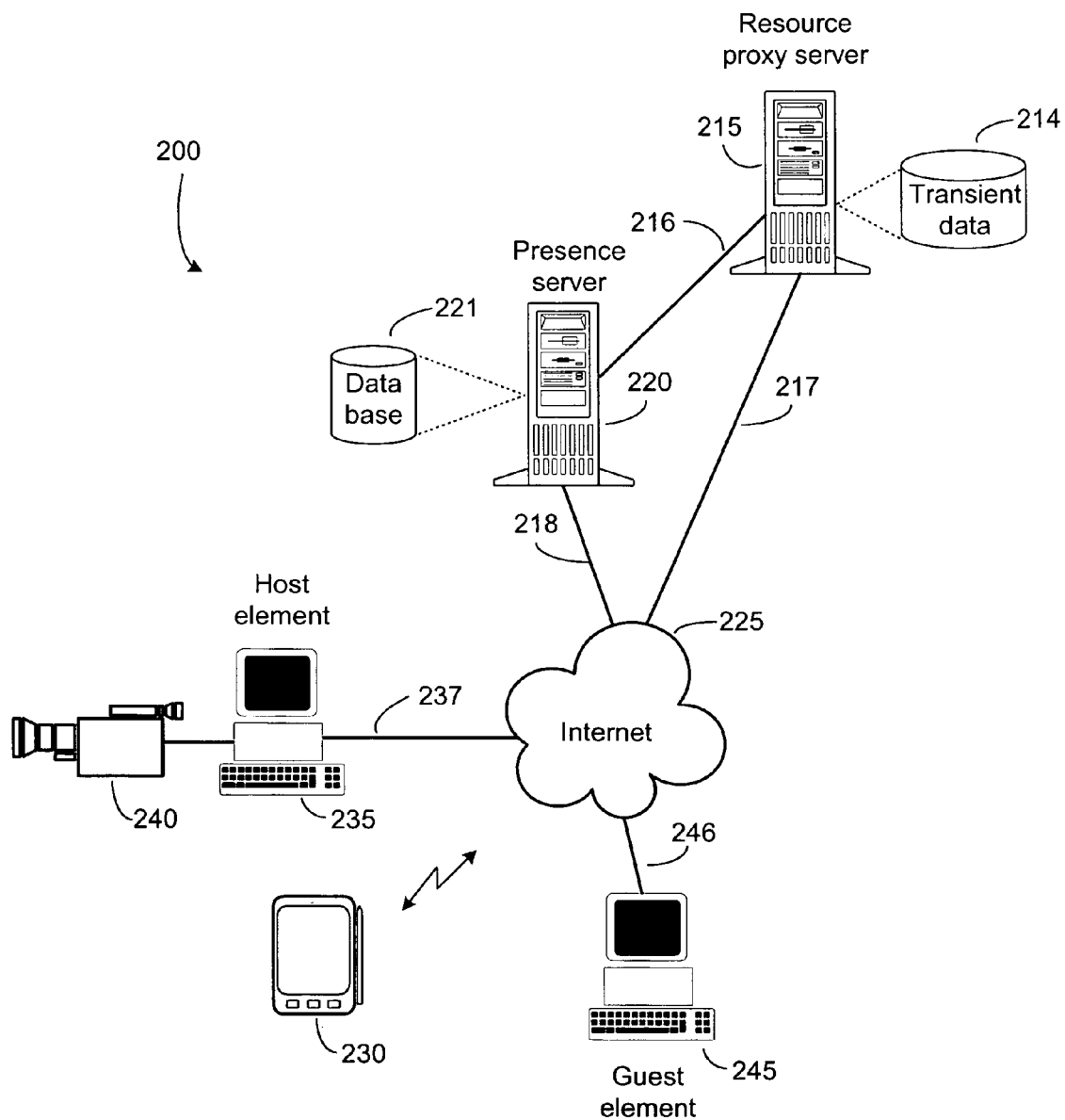
FIG. 2 illustrates a presence server and a resource proxy server incorporated into a remote resource-sharing system, such as for example, the system of FIG. 1.

Attention is now drawn to FIG. 2, which illustrates a presence server 220 and a resource proxy server 215 incorporated into a remote resource-sharing system 200. Resource-sharing system 200 is one of many exemplary embodiments of the system of FIG. 1. In this exemplary embodiment, system 200 is configured to provide IM services. Elements 230, 235, and 245 are enumerated merely as example elements, and it will be understood that many other types and quantities of elements can be incorporated into system 200. Furthermore, while the elements of system 200 are referred to below by certain functional terms, such as a host element and a guest element, it will be understood that such terms are used merely for purposes of explanation. For example, in illustrating a first exemplary mode of operation a first element is referred to as host element 235, and a second element is referred to as a guest element 245. On the other hand, in a second exemplary mode of operation the first element can operate as a guest element while the second element can operate as the host element. In yet another third exemplary mode of operation, each of the elements can operate as a host element and a guest element simultaneously. All such combinations will be understood by persons of ordinary skill in the art.

Presence server 220 provides IM services over Internet 225 to one or more IM clients. Presence server 220 incorporates a database 221 that stores, for example, information related to IM users. Such information may include user log-in status, user-activity status, and user-presence information. Presence information allows IM users to ascertain the current status of buddies present in a buddy list. Such status information includes for example online, offline, active, and inactive status of one or more buddies. The presence server 220 also provides presence information indicating the availability of shareable resources, as explained in further detail below.

The operation of system 200 will be now explained using the following example. Laura (not shown) is an operator of a host element 235 that is used for carrying out IM operations. Attached to host element 235 is an exemplary "shareable resource," which in this case is a video camera 240. Video camera 240 is a backyard webcam that provides continuous video signals into host element 235. A second exemplary shareable resource associated with host element 235 is a music file that is stored inside host element 235. A third exemplary shareable resource associated with host element 235 is one of a document, a file, and/or a directory that is also stored inside host element 235.

In general terms, a "shareable resource" refers to any element containing information that can be provided by a host element to a guest element. In the example above, the webcam is a first shareable resource that is hosted by a host element 235, and is accessed by guest element 245. Alternatively, a shareable resource refers to any content that can be transmitted from a first IM element to a second IM element. In the above-mentioned example, the music file is one such shareable resource. Element 230 may host a second shareable resource that is accessed by a guest element, where the guest element may be any element including element 235, which may in turn be acting as a host element for the first shareable resource at the same time. Also, each element may host more than one shareable resource at any particular instance in time. For example, element 235 may collectively host a webcam, a music file, and a data file.

Drawing attention back to FIG. 2, John (not shown) is an operator of element 230, which is used for transmitting and receiving IM messages. It will be understood that one or more shareable resources may be associated with element 230, as well as with guest element 245, but are not shown in FIG. 2 for the sake of brevity.

Operation of system 200 will be further explained with reference to FIG. 3A, which illustrates an exemplary buddy list 300 displayed in guest element 245 that is operated by Mike (not shown). Buddy list 300 can be referred to in various alternative terms, for example, a contact list. Mike's presence information is displayed in section 310. Because this information indicates that he is "online," both Laura and John can observe his online status on their own personal buddy lists. The presence status of Mike in the personal buddy lists of Laura and John, can be indicated in various ways. In one example, the contact name "Mike" will appear in bold script to indicate that Mike has lately operated his keyboard or mouse, while in a second case where Mike has been away from his computer for some time, the contact name appears in a shade of gray. Attention is now drawn to the entries that are subtended under the contact name "Laura," in Mike's buddy list. The three entries are termed "shareable resources," as was explained above.

In this example, Laura, who is the owner of these shareable resources, uses her machine, host element 235, to provide selective authorization to the buddies in her contact list, Mike being one of these online buddies. Laura can choose to allow Mike access to these three shareable resources while denying similar access to John. This authorization process can be carried out in many different ways, some of which are outlined below.

In a first embodiment, Laura checks the online status of Mike in her host element 235, and uses for example, a drag-and-drop procedure to place the three shareable resources under the contact name "Mike." When she does so, Mike sees on his buddy list that these three shareable resources appear under the contact name "Laura," and consequently knows that he can access these three items. On the other hand, Laura does not place any shareable resource under the contact name "John" on her buddy list. Consequently, John does not see the three shareable resources listed under Laura's contact name on his element 230.

In a second embodiment, Laura places the shareable resources inside her buddy list by using a drop-down menu. The menu contains features that allow her to provide selective authorization to various buddies. The menu further contains features that allow her to authorize a first buddy, access to a select number of shareable resources, and further authorize a second buddy, access to a second number of shareable resources.

Figure 3A:
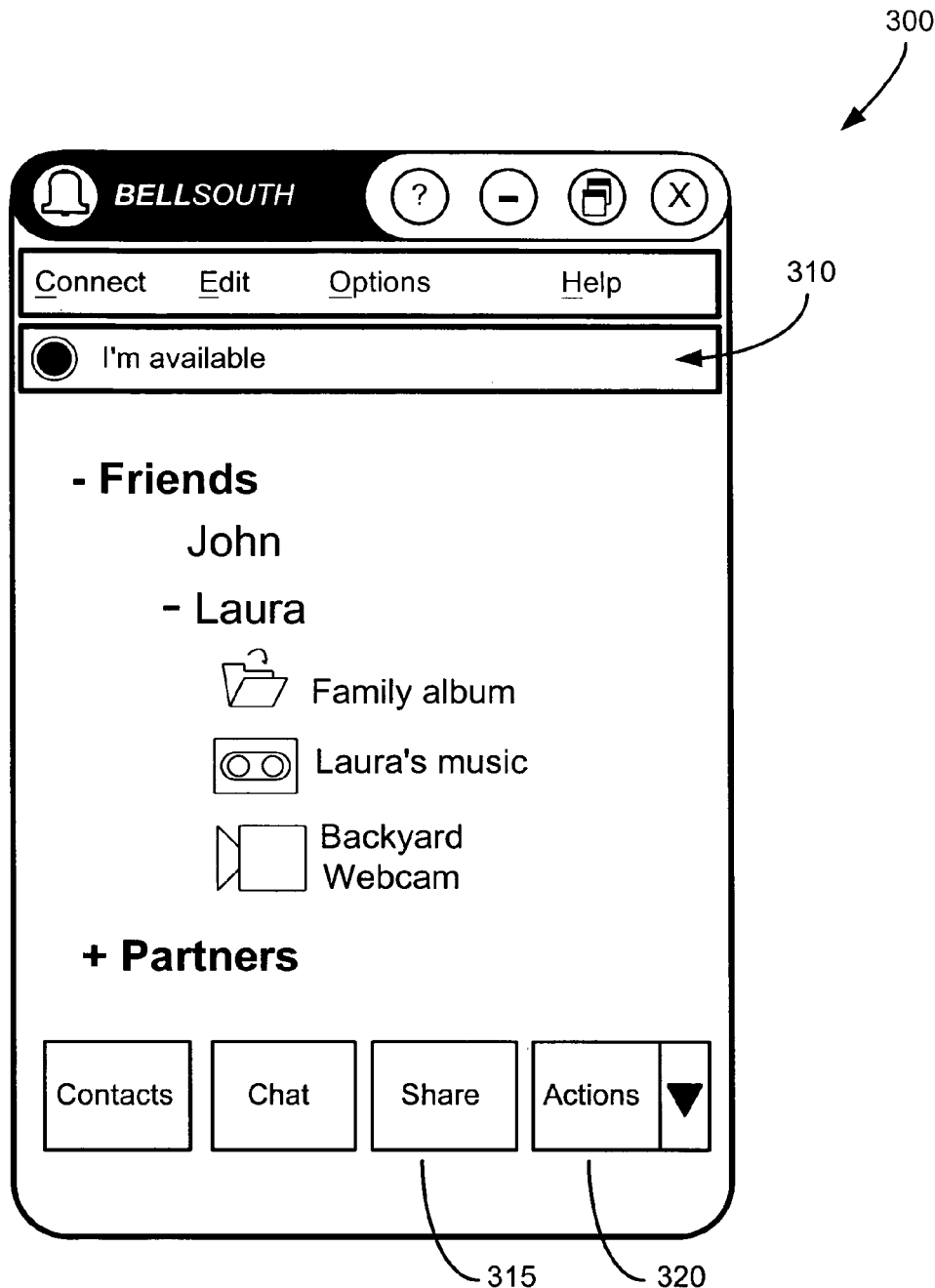
FIG. 3A shows a contact list that is displayed in an element of the communication system of FIG. 2, the communication system configured as an instant messaging system according to an exemplary embodiment.

In yet another alternative embodiment, the shareable resources are placed in the buddy list by using the "Actions" button 320 shown in FIG. 3A. Once the shareable resource is in the buddy list, active sharing of shareable resource may be initiated using the "Share" button 315 shown in FIG. 3A.

One or more shareable resources can be selectively removed from a buddy list. Also, authorization can be revoked via the buddy list. In the examples above, Laura may decide to subsequently remove the backyard webcam from her shareable resource list, and may, if she so desires, to revoke authorization to Mike for access of her music files.

On the guest-end buddy lists, the display of shareable resources, accessible or otherwise, as well as authorization status, can be provided in multiple ways. For example, in one exemplary embodiment, though both John and Mike can observe Laura's shareable resources, only Mike is authorized to access one or more of these shareable resources. The display of such authorization can comprise bolded script, grayed-out script, an icon, or a message. Presence-based services can be utilized to implement this example.

It will be understood that the above-mentioned examples are provided merely for explanation purposes, and there exist many different ways in which the various activities/features such as, but not limited to, providing shareable resources, removing shareable resources, providing authorization for access, revoking authorization for access, displaying shareable resources, and displaying authorization status, can be implemented.

Presence server 220 and resource proxy server 215 communicatively couple with the host element 235 and the guest element 245 to provide the features outlined above. For example, when Laura places the shareable resources for access by Mike, guest element 235 communicates this information to presence server 220, via communication link 237, Internet 225, and link 218. Presence server 220 transmits a remote resource-share request to resource proxy server 215, using communication link 216. Upon receiving such a request, resource proxy server 215 assigns a resource proxy to handle the request. The resource proxy comprises a data buffer, such as transient data 214 of FIG. 2, that can receive data from host element 235. In one embodiment, the resource proxy further comprises a directory and a uniform resource locator (URL). Once the resource proxy server 215 has completed setting up resource proxy, a message is transmitted by the resource proxy server 215 to the presence server 220, via communication link 216. Presence server 220 then provides resource presence information to guest element 245 as well as host element 235, via Internet 225 and links 246 and 237, respectively. In this exemplary embodiment, links 246 and 237, as well as links 216, 217 and 218, which are similar to links in FIG. 1, are configured to carry IP data packets. In other embodiments, data is carried in alternative formats.

Figure 3B:
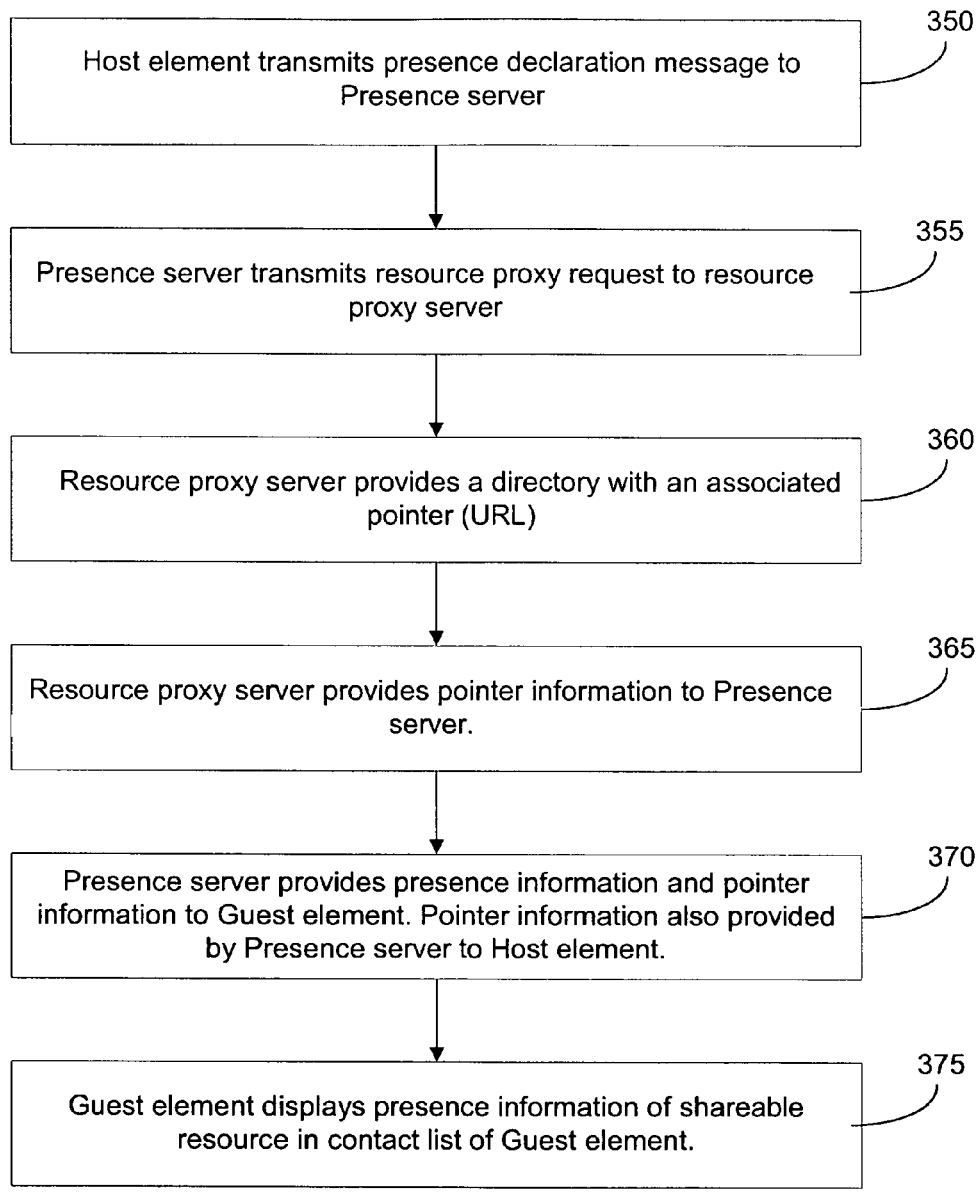
FIG. 3B shows a flowchart of an exemplary method of configuring the sharing of a shareable resource using an instant messaging system.
Figure 3C:
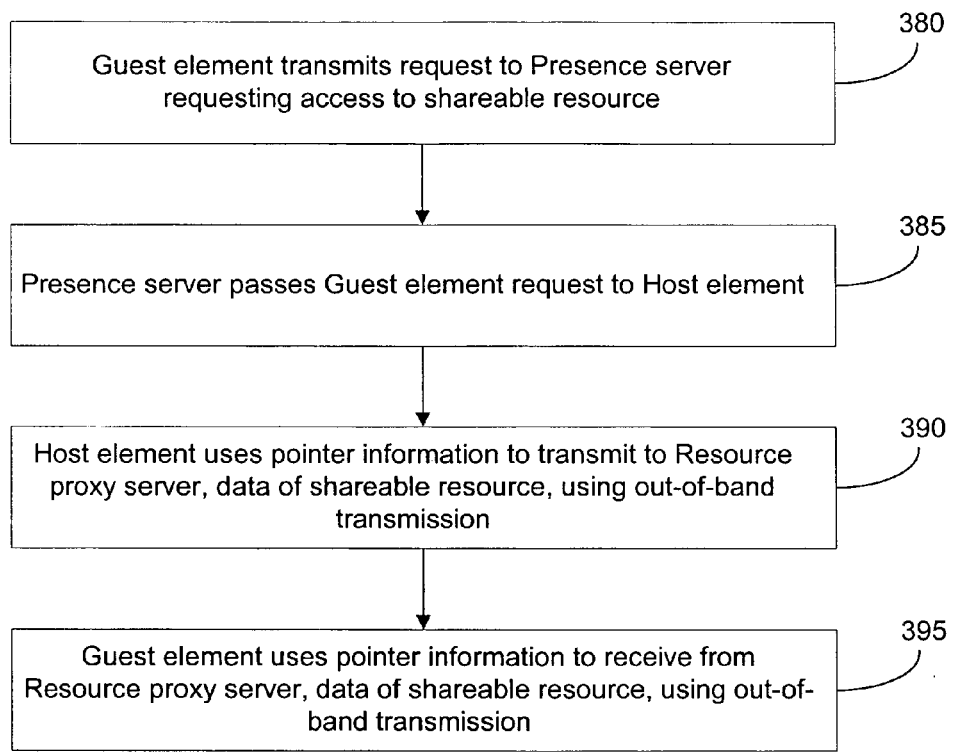
FIG. 3C shows a flowchart of an exemplary method of sharing the shareable resource of FIG. 3B.

The operation described above will be better understood with reference to FIGS. 3B and 3C that are described herein. FIG. 3B shows a flowchart of an exemplary method of configuring the sharing of a shareable resource using, e.g., an IM system, while FIG. 3C shows a flowchart of an exemplary method of sharing the shareable resource of FIG. 3B. Any process descriptions or blocks in flow charts should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

Drawing attention to FIG. 3B, in block 350, the host element transmits a presence declaration message to a presence server. Such a declaration message is transmitted to indicate the presence of a shareable resource that is communicatively coupled to the host element. In one embodiment among many, the declaration message is transmitted in a communication format that conforms to an IM system. Upon receipt of the presence declaration message, the presence server transmits a resource proxy request to a resource proxy server, as is shown in block 355. This request, in one among several embodiments, is also carried out in a communication format that conforms to an IM system. In block 360, the resource proxy server provides a resource proxy, which, in one embodiment, includes a pointer. While alternative implementations implement the pointer in different ways, in one exemplary embodiment, the pointer is a URL. This pointer information is transmitted to the presence server, as illustrated in block 365.

In block 370, the presence server provides this pointer information to the host and the guest elements. The guest element is also provided with the presence information of the shareable resource, which indicates an authorization to access the shareable resource. In block 375, the guest element uses the information transmitted by the presence server to display the name of the resource in a contact list that is displayed to a user of the guest element.

It will be understood that the method steps outlined in FIG. 3B is typically carried out, in one embodiment among many, inside an IM system, using IM communication processes. Consequently, only authorized users of the IM system can utilize the remote resource sharing system, thereby precluding non-IM users from accessing the shareable resource, even though the IM system uses the Internet for inter-connectivity and other Internet users, such as web-surfers and e-mailers, will be using the Internet at the same time.

Turning to FIG. 3C, in block 380, the user of the guest element initiates a request to access the shareable resource, by, for example, clicking on the resource name in the contact list. An IM communication is transmitted from the guest element to the presence server to convey this request. The presence server passes on this request to the host element, as is shown in block 385. In block 390, upon receipt of the request, the host element uses the pointer information to begin transmitting the resource data to the resource proxy server. When the pointer information is a URL, the host element directs the data to the URL. The resource data is transmitted to the resource proxy server, in an out-of-band transmission link, for example, as an Internet data packet transmission. It will be understood, that such an out-of-band transmission takes places outside the IM system. Consequently, IM messaging and other IM-related activities can be concurrently carried out while the data is being transferred. The data is typically stored, in a temporary manner, in the resource proxy provided by the resource proxy server. In one example, the resource proxy comprises a transient data buffer associated with a file directory. The data buffer holds the data and forwards it, in a near-real-time manner to the guest element.

In block 395, the guest element also uses the pointer information, for example, the URL, to communicate with the resource proxy server and obtain the resource data. The transfer of resource data from the resource proxy server to the guest element also occurs in an out-of-band transmission, thereby allowing an IM user on the guest element to communicate with other IM users concurrent to the date transfer.

Using a URL as pointer information, allows both the guest element as well as the host element to use the resource proxy server as a web server for the resource data sharing. The host element transfers resource data to the resource proxy server in a manner that is similar to a data upload from a client device to a web server, and the guest element receives data from the resource proxy server in a manner that is similar to a download from a web server to a client device. This system for data transfer provides several advantages over peer-to-peer data transfers that require traversal of firewalls located in peer devices.

Figure 4:
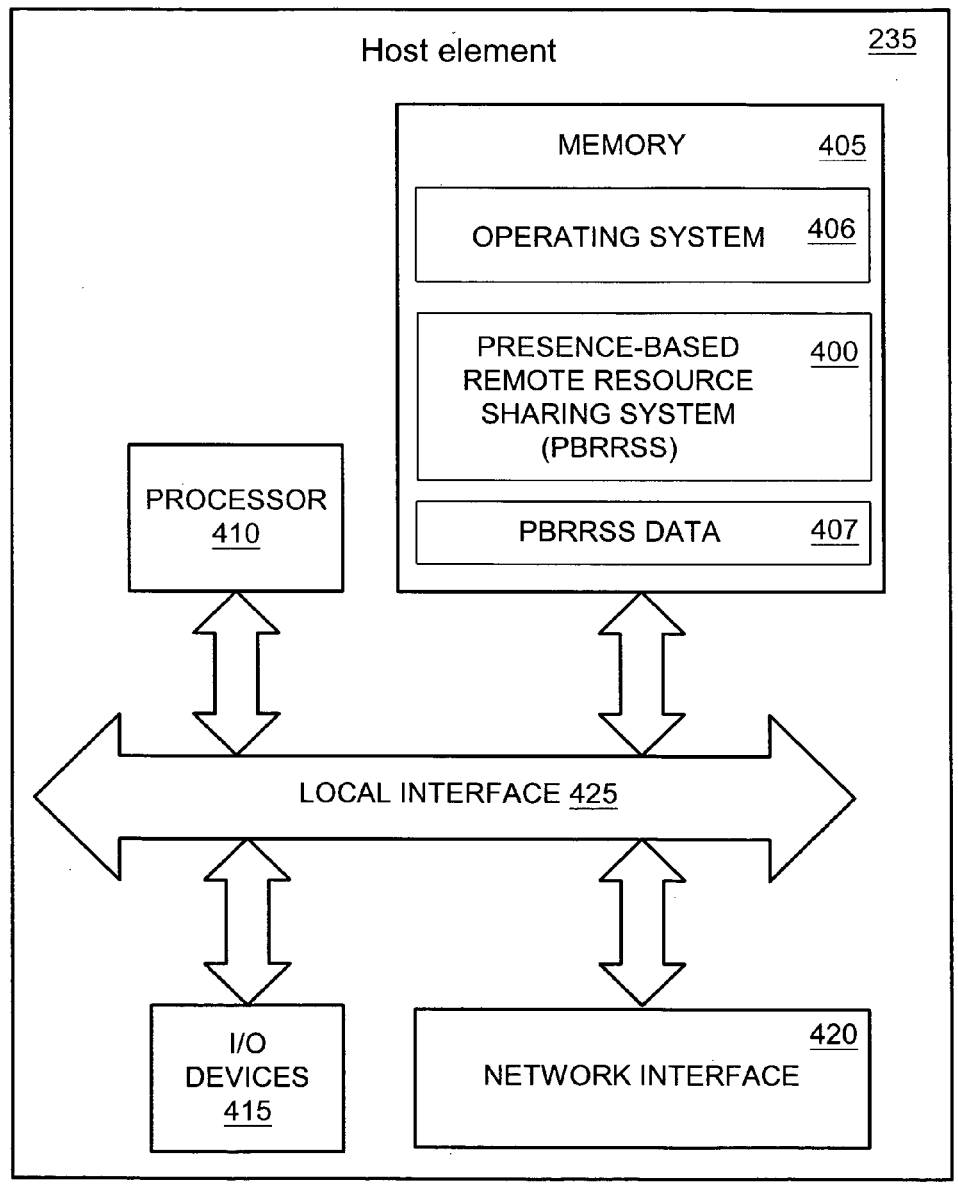
FIG. 4 is a block diagram illustrating various functional blocks incorporated inside a host element as shown in FIG. 2.

Attention is now drawn to FIG. 4, which illustrates a block diagram illustrating various functional blocks incorporated inside host element 235 according to an exemplary embodiment. FIG. 4 will be described in one exemplary embodiment, and it will be understood that many other embodiments exist incorporating the principles and features that are described herein. All such embodiments are included in the scope of this disclosure. Generally, in terms of hardware architecture, host element 235 includes a processor 410, memory 405, a network interface 420, and one or more input and/or output (I/O) devices 415 (or peripherals) that are communicatively coupled via a local interface 425. It will be understood that additional blocks such as a LAN network interface, a WAN network interface, and a high-speed digital I/O may also be incorporated into the block diagram of FIG. 4.

The local interface 425 comprises one or more buses or other wired or wireless connections, as is known in the art. In some embodiments, the local interface 425 includes additional elements, which are omitted for simplicity, such as controllers, buffers (caches), drivers, repeaters, and receivers, to enable communications. Further, the local interface includes address, control, and/or data connections to enable appropriate communications among the aforementioned components.

The processor 410 is a hardware device for executing software, particularly that stored in memory 405. The processor 410, in one embodiment among many, is a custom-made or commercially available processor, a central processing unit (CPU), an auxiliary processor among several processors associated with the host element 235, a semiconductor based microprocessor (in the form of a microchip or chip set), a macroprocessor, or generally any device for executing software instructions.

The memory 405 includes any one or combination of volatile memory elements and nonvolatile memory elements. Moreover, in alternative embodiments, memory 405 incorporates electronic, magnetic, optical, and/or other types of storage media. Note that the memory 405 can have a distributed architecture, where various components are situated remote from one another, but can be accessed by the processor 410.

The software in memory 405 includes one or more separate programs, each of which comprises an ordered listing of executable instructions for implementing logical functions. In the example of FIG. 4, the software in the memory 405 includes a presence-based remote resource-sharing system (PBRRSS) 400 that is one among several embodiments of the present disclosure, a PBRRS database 407, and a suitable operating system (O/S) 406. Persons of ordinary skill in the art will understand that there are many alternative hardware and software platforms that can be used to implement host element 235. The operating system 406 essentially controls the execution of other computer programs, such as PBRRSS 400, and provides scheduling, input-output control, file and data management, memory management, and communication control and related services.

In one embodiment among many, the PBRRSS 400 is implemented using logic incorporated in programs, such as a source program, executable program (object code), script, or any other entity comprising a set of instructions to be performed. When a source program, then the program needs to be translated via a compiler, assembler, interpreter, or the like, which may or may not be included within the memory 405, so as to operate properly in connection with the O/S 406.

The I/O devices 415 includes input devices, for example but not limited to, a keyboard, mouse, scanner, microphone, etc. Furthermore, the I/O devices 415 may also include output devices, for example but not limited to, a printer. Finally, the I/O devices 415 further includes devices that communicate both inputs and outputs, for instance but not limited to, a modulator/demodulator (modem; for accessing another device, system, or network), a radio frequency (RF) or other transceiver, a telephonic interface, a bridge, a router, etc.

If the host element 235 is a PC, workstation, or the like, the software in the memory 405 further includes, in one embodiment, a basic input output system (BIOS) (omitted for simplicity). The BIOS is a set of essential software routines that initialize and test hardware at startup, start the O/S 406, and support the transfer of data among the hardware devices. The BIOS is stored in ROM so that the BIOS can be executed when the host element 235 is activated.

When the host element 235 is in operation, the processor 410 is configured to execute software stored within the memory 405, to communicate data to and from the memory 405, and to generally control operations of the host element 235 pursuant to the software. The PBRRSS 400, PBRRSS data 407, and the O/S 406, in whole or in part, but typically the latter, are read by the processor 410, perhaps buffered within the processor 410, and then executed.

When the PBRRSS 400 is implemented in software, as is shown in FIG. 4, it should be noted that the PBRRSS 400 is stored on any computer readable medium for use by or in connection with any computer related system or method. For example, in one of several embodiments, the PBRRSS 400 is a computer program or script that runs on a stand-alone server, a network server, or on one or more computers that are part of a network.

In the context of this document, a computer readable medium is an electronic, magnetic, optical, or other physical device or means that can contain or store a computer program for use by or in connection with a computer related system or method. The PBRRSS 400 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the PBRRSS 400 is implemented using hardware logic, the PBRRSS 400 is implemented with any or a combination of the following technologies, which are each well known in the art: a discrete logic circuit(s) having logic gates for implementing logic functions upon data signals, an application specific integrated circuit (ASIC) having appropriate combinatorial logic gates, a programmable gate array(s) (PGA), a field programmable gate array (FPGA), etc. The hardware can be housed in a stand-alone computer or in one or more computers of a network.

Also shown in FIG. 4 is a database, PBRRSS data 407, which is shown as a part of memory 405 for convenience of explanation. Database 407 operates together with PBRRSS 400 to provide the functionality of resource sharing as outlined above.

Figure 5:
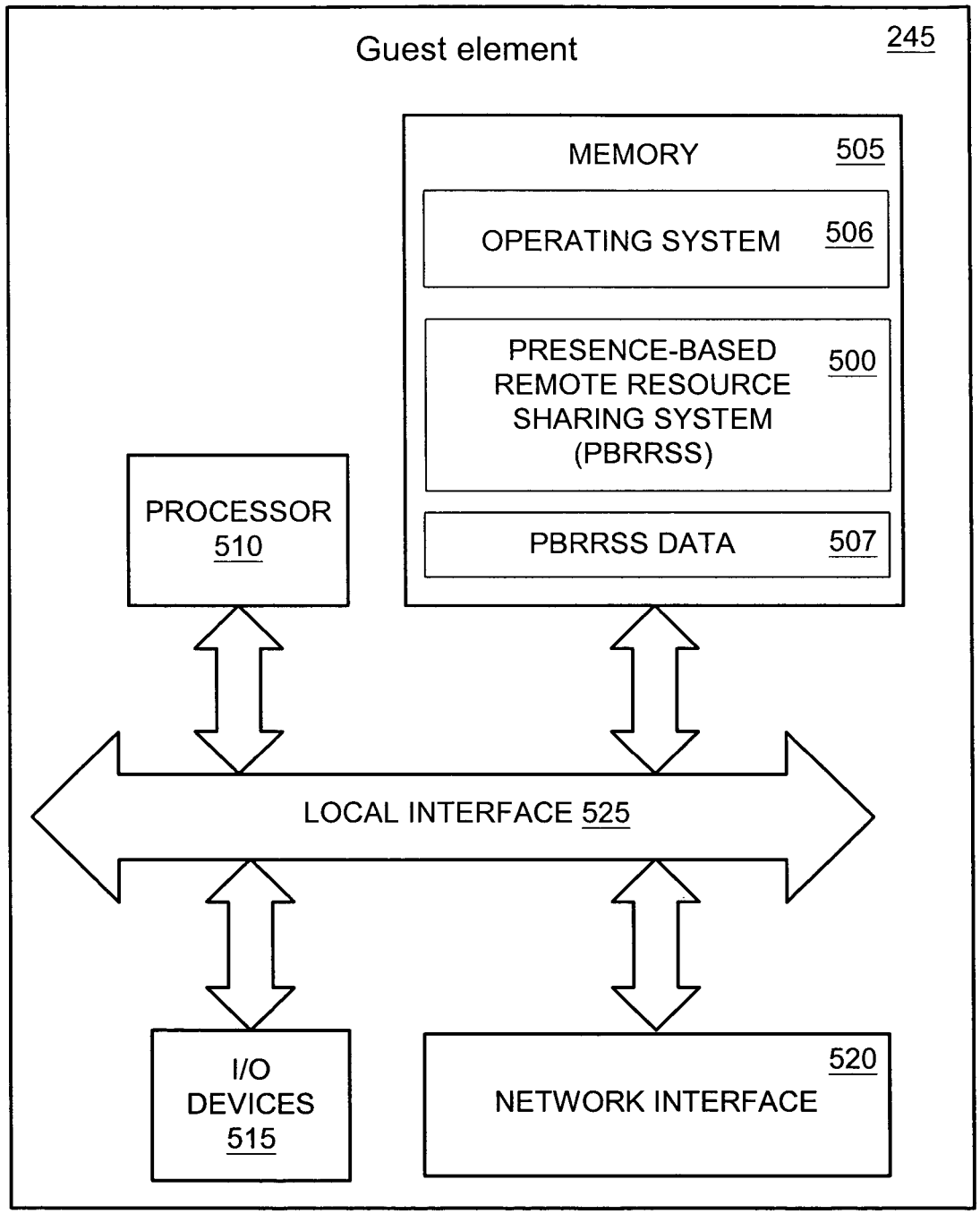
FIG. 5 is a block diagram illustrating various functional blocks incorporated inside a guest element as shown in FIG. 2.
Figure 6:
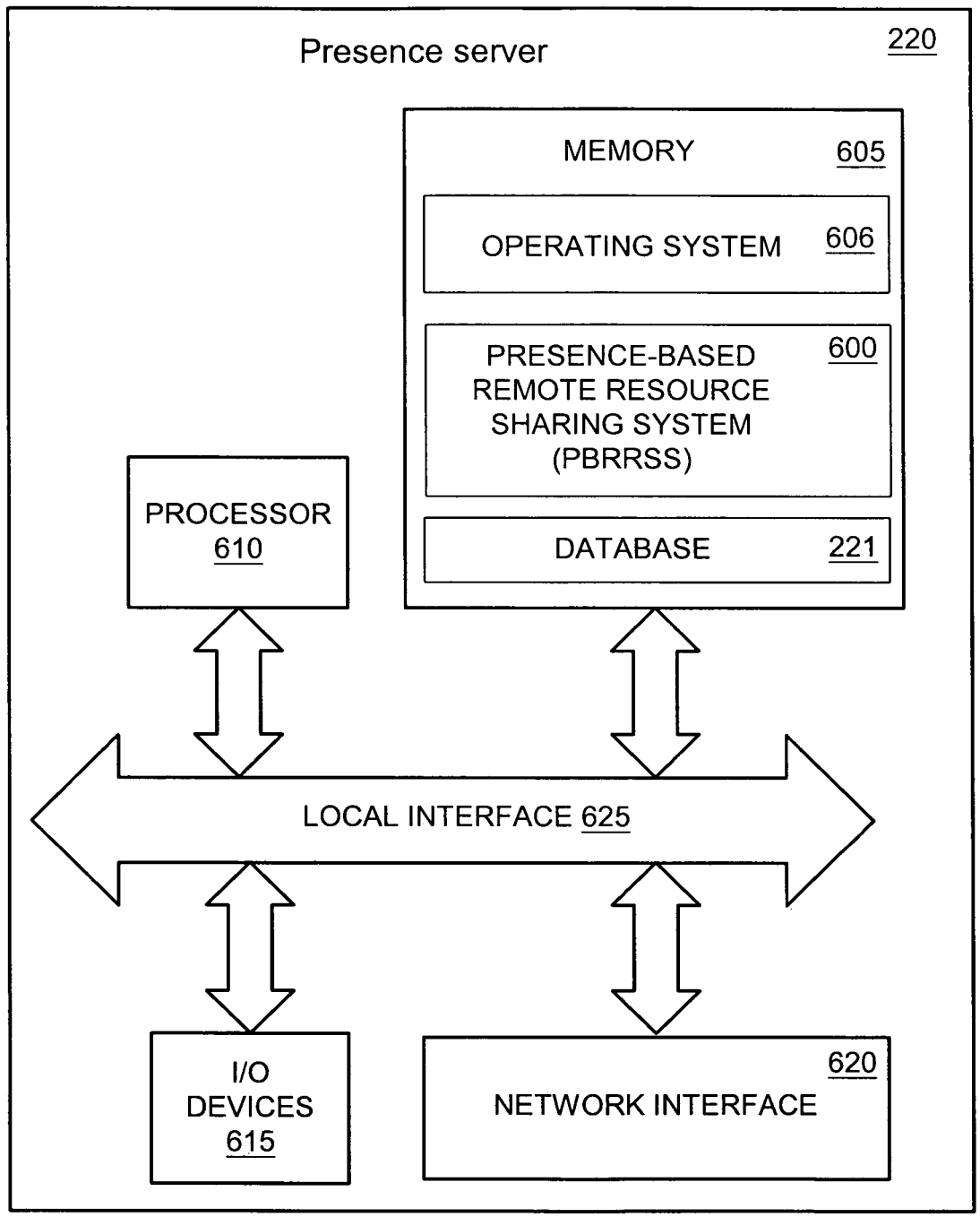
FIG. 6 is a block diagram illustrating various functional blocks incorporated inside a presence server as shown in FIG. 2.
Figure 7:
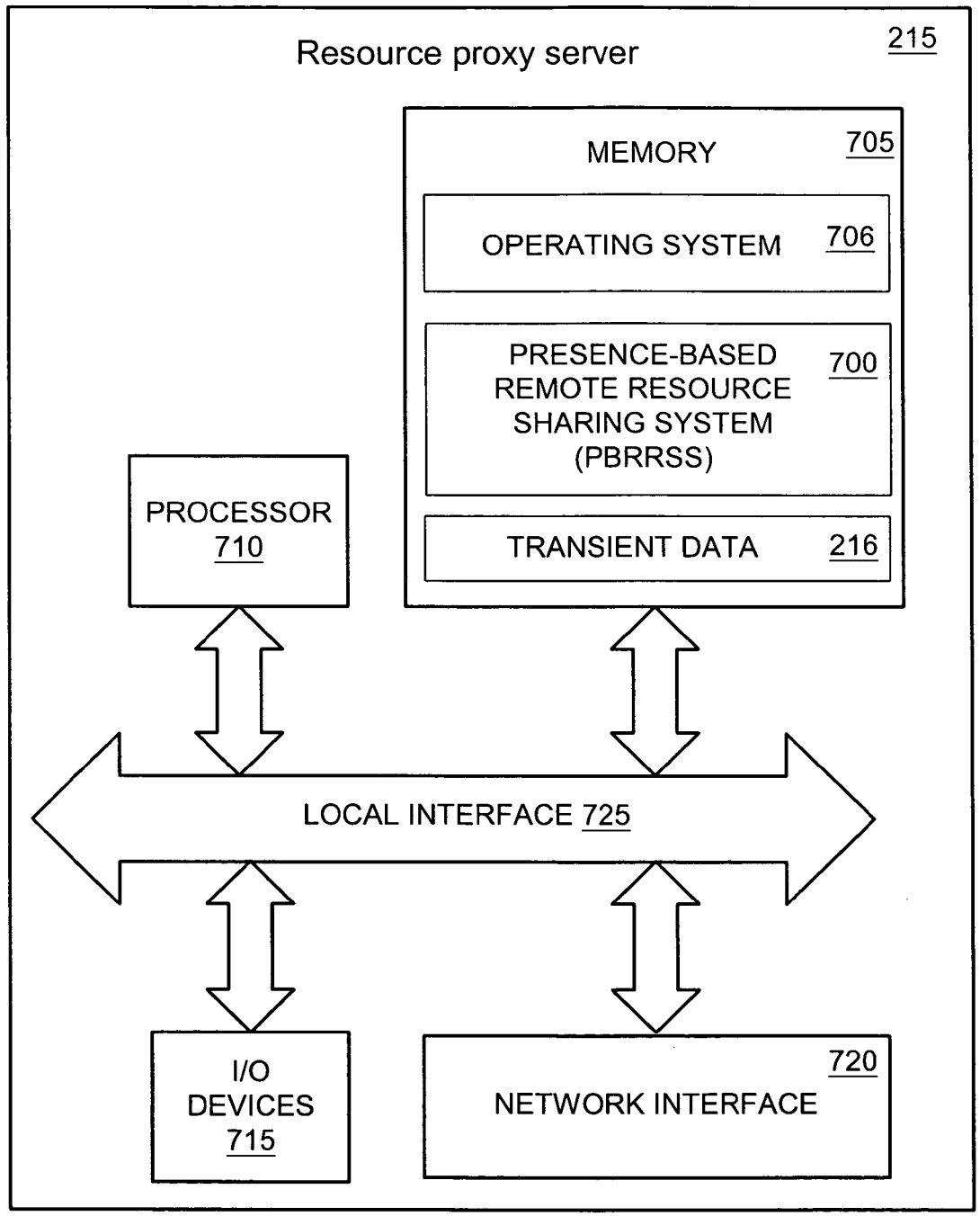
FIG. 7 is a block diagram illustrating various functional blocks incorporated inside a resource proxy server as shown in FIG. 2.

Attention is now drawn to FIGS. 5, 6, and 7, each of which illustrate various functional blocks incorporated inside guest element 245, presence server 220, and resource proxy server 215, respectively, according to exemplary embodiments. In the interests of brevity, an elaborate description of these figures will not be provided here, because persons of ordinary skill in the art will understand these figures with reference to the explanation provided above for FIG. 4. It will be relevant to point out that memory 605 of presence server 220 includes a database 221 that would, typically, incorporate IM-server related data. PBRRSS 600 of presence server 220 carries out IM-related server functions such as providing to one or more contact lists, contact information, user/resource presence information, resource authorization information, etc.

Memory 705 of resource proxy server 215 is shown including PBRRSS 700 that typically stores OSS-related programs that may be used by the resource proxy server to interact with presence server 220. Memory 705 further includes a database, transient data 214, which, in one exemplary embodiment, is a temporary data buffer to store data from a resource. The transient storage is, typically, eliminated when a first instance of remote resource sharing is no longer active, and is subsequently re-assigned to a second remote resource-sharing operation involving the same or different elements.

Figure 8:
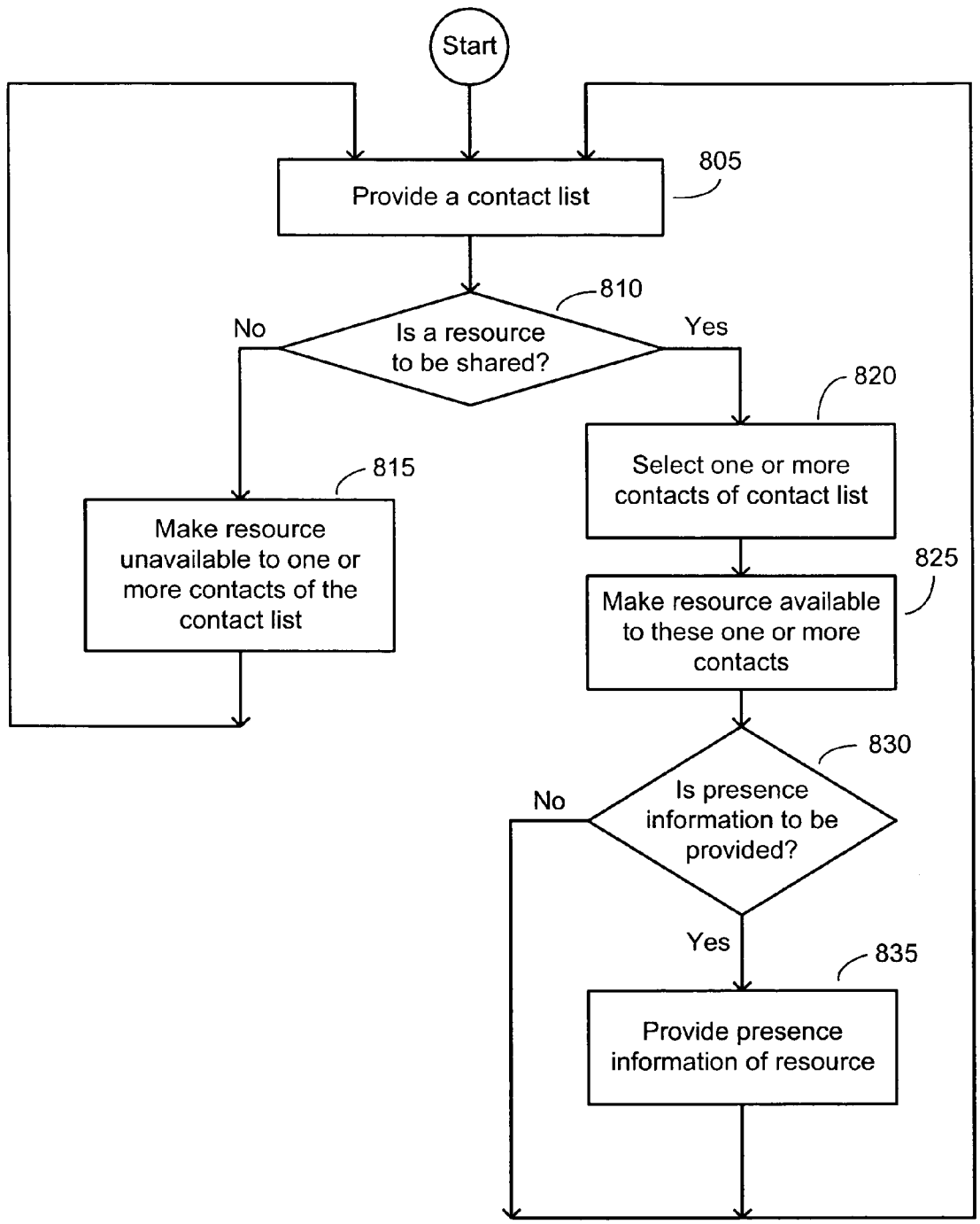
FIG. 8 is a flowchart that illustrates an exemplary method of operation of a remote resource-sharing system using presence-based services.

Turning to FIG. 8, which is a flowchart illustrating one among several methods of sharing resources in a presence-based system such as IM. In block 805, a contact list is provided in a host element, such as host element 235 of FIG. 2. The host element typically contains one or more shareable resources that an operator of the host element can share with one or more buddies who are present in his contact list. If the operator wishes to share a shareable resource (block 810), block 820 is implemented to allow the operator to select one or more contacts from his contact list. Subsequently, in block 825, the shareable resource is made available to these selected contacts. The detailed operation of blocks 820 and 825 have been explained earlier, where for example, the operator drags the shareable resource and places it in a subtended manner under an appropriate contact name.

Alternatively, the operator can highlight one or more buddies in the contact list, and pick the shareable resource from a drop-down menu, whereupon the system operates to display the shareable resource subtended to the operator's name in a contact list displayed in the buddies' device(s). Thereinafter, in blocks 830 and 835, presence information is utilized to selectively display the authorization status and availability of the shareable resource to one or more buddies.

When an operator of a guest element, such as guest element 245 of FIG. 2, accesses the shareable resource, by for example, double-clicking on the name of the shareable resource on his contact list, the shareable resource is made available to him. In a first example, if the shareable resource is a webcam, streaming video from the webcam is transported from the host element 235 to the resource proxy server 215, and from the resource proxy server 215 to the guest element 245. In a second example, if the shareable resource is a text document stored under a certain directory in the host element 235, the operator of guest element 245 can be provided access to the document, which he can then access as explained above. Furthermore additional features such as read/write privileges, denial of access to other files in the same directory, copy privileges, etc. can also be provided.

It will be understood that the operator of guest element 245 need not necessarily be aware of the physical location of the shareable resource—whether it is an attached device such as the webcam, or a file located inside a directory. In one embodiment, the filename will be displayed in the contact list with no additional information to indicate the directory under which it is located. It will be also understood that accessing the shareable resource can be carried out in a simultaneous manner to operating the IM service. Therefore, for example, IM messages can be sent back and forth, while the operator of guest element 245 is viewing the video from the webcam.

Figure 9:
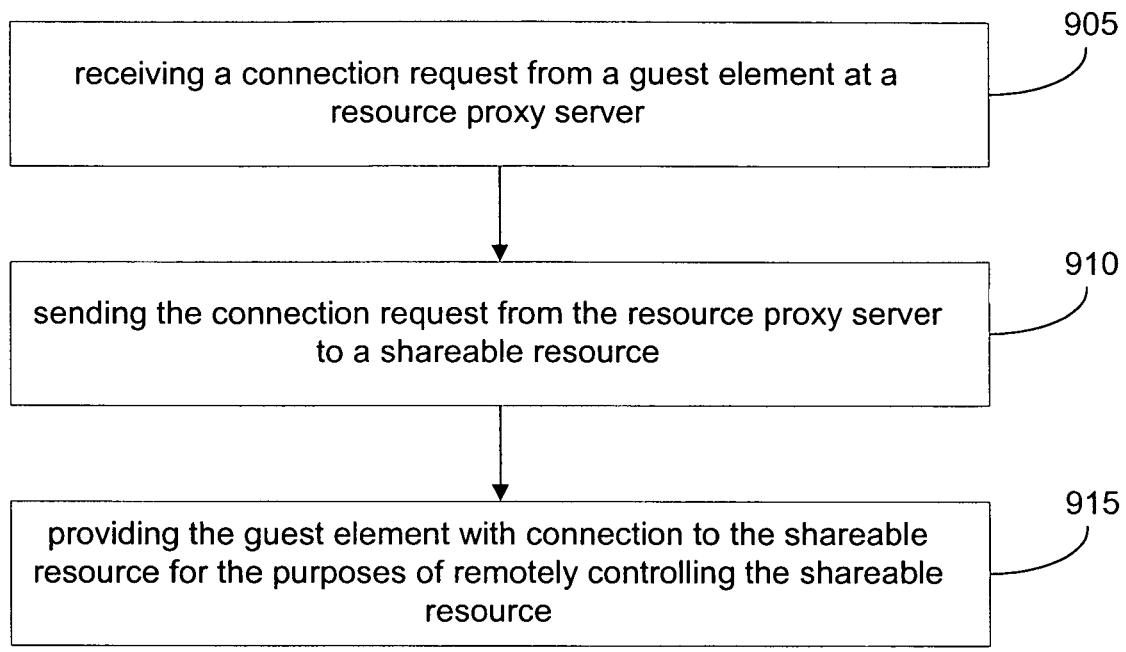
FIG. 9 is a flowchart that illustrates an exemplary method of remotely controlling a shareable resource.

FIG. 9 is a flowchart that illustrates an exemplary method of remotely controlling a shareable resource. In block 905, a connection request is received at a resource proxy server, from a guest element. The connection request is for the purpose of allowing the guest element to remotely control a shareable resource. In block 910, the connection request is forwarded from the resource proxy server to the shareable resource, and in block 915, the guest element is provided a connection to the shareable resource. The guest element can now remotely control the shareable resource.

It should be emphasized that the above-described embodiments are merely possible examples of implementations and are set forth merely for providing a clear understanding of the principles. Many variations and modifications may be made to the above-described embodiment(s) of the disclosure without departing substantially from the spirit and principles of the disclosure. For example, although the embodiments above are directed to instant messaging, it should be appreciated that the invention is applicable to other types of messaging. All such modifications and variations are intended to be included herein within the scope of this disclosure.

I claim:

1. A resource sharing system comprising:
   a host element;
   a shareable resource associated with the host element, the shareable resource comprising a video camera; and
   a presence server communicatively coupled to the host element, the presence server to operate in an instant messaging environment, the presence server comprising:
   a memory having machine readable instructions stored thereon; and
   a processor to execute the instruction to perform operations comprising:
      providing instant messaging presence information of the video camera, the instant messaging presence information providing availability status information of the video camera to a first guest element, the instant messaging presence information being determined based on an authorization procedure performed at the host element to authorize the first guest element to access the video camera and to not authorize a second guest element to access the video camera; and
      receiving, via the instant messaging environment, an access request from the first guest element requesting access to the video camera associated with the host element, the host element to send resource data comprising streaming video data provided by the video camera to the first guest element via an out-of-band transportation of the streaming video data from the host element to the first guest element occurring outside the instant messaging environment in response to the access request, the out-of-band transportation of the streaming video data to the first guest element occurring while the first guest element is concurrently sending further instant messaging.

2. The system of claim 1, further comprising:
   a resource proxy server communicatively coupled to the presence server, the resource proxy server to receive a resource proxy request from the presence server.

3. The system of claim 2, wherein the resource proxy server is to provide a resource proxy to carry out the out-of-band transportation of the resource data from the host element to the first guest element.

4. The system of claim 3, wherein the resource proxy server assigns a uniform resource locator as the resource proxy, and wherein the host element uses the uniform resource locator to transmit the resource data from the host element to the resource proxy server, and the first guest element uses the uniform resource locator to receive the resource data from the resource proxy server.

5. The system of claim 1, further comprising a second shareable resource capable of digital media storage and communication, the second shareable resource being different from the video camera, and the instant messaging presence information to provide second availability status information of the second shareable resource.

6. The system of claim 5, wherein the second shareable resource comprises at least one of a file, a digital camera, a digital camcorder, a digital telephone, a personal digital assistant, a printer, a digital video recorder/player, or a scanner; and the file comprises at least one of an image, an audio recording, or a video recording.

7. The system of claim 1, wherein the first guest element is to indicate an authorization to access the shareable resource, wherein the shareable resource is identified by presence information of the shareable resource in a contact list displayed in the first guest element.

8. The system of claim 7, wherein the authorization comprises a display of a shareable resource name subtended to a contact name in the contact list of at least one of a plurality of users of the resource sharing system.

9. The system of claim 1, wherein the presence server also provides information indicating availability of users of the resource sharing system.

10. An apparatus to share resources in a communication network, the apparatus comprising:
    a data storage component containing data pertaining to providing instant messaging services to a first user of the communication network;
    a first communication link to receive information indicating instant messaging presence of a shareable resource comprising a video camera associated with a host element, the instant messaging presence information being received in response to an authorization procedure performed at the host element to authorize the first user to access the video camera and to not authorize a second user to access the video camera based on a representation of the video camera having been moved under a contact name of the first user, but not under a contact name of the second user, included in a contact list presented by the host element;
    a second communication link to the first user of the communication network to provide instant messaging presence information including availability status information of the video camera to the first user of the communication network; and
    a third communication link to a resource proxy server to request a resource proxy to perform an out-of-band transportation of resource data comprising streaming video data associated with the video camera from the host element to the first user of the communication network, the out-of-band transportation of the streaming video data occurring outside an instant messaging system providing the instant messaging presence information, but in response to an access request requesting access to the video camera associated with the host element and received via the instant messaging system, the out-of-band transportation of the streaming video data comprising sending the streaming video data to the proxy server via a uniform resource locator associated with the proxy server in response to the access request and then using the same uniform resource locator to retrieve the streaming video data from the proxy server for the first user.

11. The apparatus of claim 10, wherein the second communication link is to provide, to the first user of the communication network, an authorization to access the shareable resource.

12. The apparatus of claim 10, wherein the messaging services are instant messaging services.

13. A tangible computer-readable storage medium excluding propagating signals and storing computer readable instructions for operating a presence server in a communication network, the computer readable instructions, when executed, to cause the presence server to perform operations comprising:
   receiving information indicating instant messaging presence of a video camera associated with a host element, the instant messaging presence information being received in response to an authorization procedure performed at the host element to authorize a first guest user to access the video camera and to not authorize a second guest user to access the video camera based on a representation of the video camera having been moved under a contact name of a first guest user, but not under a contact name of the second user, included in a contact list presented by the host element;
   providing instant messaging presence information, wherein the presence information provides availability status information of the video camera to a guest element associated with the first guest user; and
   providing a uniform resource locator as a resource proxy for out-of-band data transmission to be performed in response to an access request requesting access to the video camera and received from the guest element via an instant messaging system, the uniform resource locator included with the instant messaging presence information provided to the guest element by the presence server, the uniform resource locator to be used to perform out-of-band transmission of resource data comprising streaming video data associated with the video camera from the host element to a resource proxy server in response to the access request and the uniform resource locator to be used to perform out-of-band transmission of the streaming video data associated with the video camera from the resource proxy server to the guest element, the out-of-band transmission of the streaming video data from the host element to the resource proxy server and from the resource proxy server to the guest element to occur outside the instant messaging system conveying the access request.

14. The tangible computer-readable storage medium of claim 13, wherein the operations further comprise:
   providing an authorization comprising a display of a shareable resource name subtended to a contact name in a contact list presented by the guest element.

15. A method of providing a connection between a guest element and a shareable resource communicatively coupled to a host element to remotely control the shareable resource, the method comprising:
   providing instant messaging presence information indicating availability of a shareable resource comprising a video camera associated with the host element, the presence information being determined based on an authorization procedure performed at the host element to authorize a first guest user associated with the guest element to access the video camera and to not authorize a second guest user to access the video camera;
   receiving via an instant messaging system an instant messaging connection request from the guest element at a resource proxy server;
   sending the instant messaging connection request from the resource proxy server to the shareable resource; and
   in response to the instant messaging connection request, providing the guest element with a connection to the video camera via the host element to send data to the video camera to instruct the video camera to execute a command to remotely control the video camera, the connection to the video camera to be provided using out-of-band communication occurring outside the instant messaging system used to convey the instant messaging connection request.

16. The method of claim 15, further comprising a second shareable resource capable of digital media storage and communication, the second shareable resource being different from the video camera.

17. The method of claim 15, wherein to remotely control the shareable resource, the method further comprises requesting and receiving data from the shareable resource.

* * * * *